United States Patent [19]

Yusko, Jr. et al.

[11] Patent Number: 4,792,118
[45] Date of Patent: Dec. 20, 1988

[54] LOW DEAD SPACE RING

[75] Inventors: Edward M. Yusko, Jr.; Peter C. Williams, both of Cleveland Heights, Ohio

[73] Assignee: Whitey Co., Highland Hts., Ohio

[21] Appl. No.: 64,108

[22] Filed: Jun. 18, 1987

Related U.S. Application Data

[63] Continuation of Ser. No. 828,751, Feb. 12, 1986.

[51] Int. Cl.[4] .............................................. F16K 5/06
[52] U.S. Cl. ..................................... 251/315; 251/214
[58] Field of Search ............... 251/171, 174, 214, 315, 251/317

[56] References Cited

U.S. PATENT DOCUMENTS

| | | | |
|---|---|---|---|
| 3,061,269 | 10/1962 | Sinkler | 251/317 |
| 3,133,722 | 5/1964 | McGuire | 251/317 X |
| 3,167,300 | 1/1965 | Kaiser | 251/315 |
| 3,398,925 | 8/1968 | Scaramucci | 251/317 X |
| 3,647,179 | 3/1972 | Scaramucci | 251/317 X |
| 3,894,718 | 7/1975 | Koch | 251/174 X |
| 4,410,165 | 10/1983 | Koch | 251/174 |

FOREIGN PATENT DOCUMENTS

| | | | |
|---|---|---|---|
| 2346489 | 3/1975 | Fed. Rep. of Germany | 251/315 |
| 2137735 | 10/1984 | United Kingdom | 251/315 |

Primary Examiner—A. Michael Chambers
Assistant Examiner—John C. Fox
Attorney, Agent, or Firm—Fay, Sharpe, Beall, Fagan, Minnich & McKee

[57] ABSTRACT

A ball valve includes a ball member rotatable in a valve chamber and cooperating with a pair of opposed seal assemblies. Each seal assembly comprises a support ring and disc spring having a resilient seal member interposed therebetween. A normally occuring void in the valve chamber is filled through use of a pair of dead space rings. These dead space rings are formed of a rigid, low friction material that does not substantially increase the torque required to rotate the ball member. In addition, the rigid material prevents cold flow of the material into the fluid passageway.

1 Claim, 2 Drawing Sheets

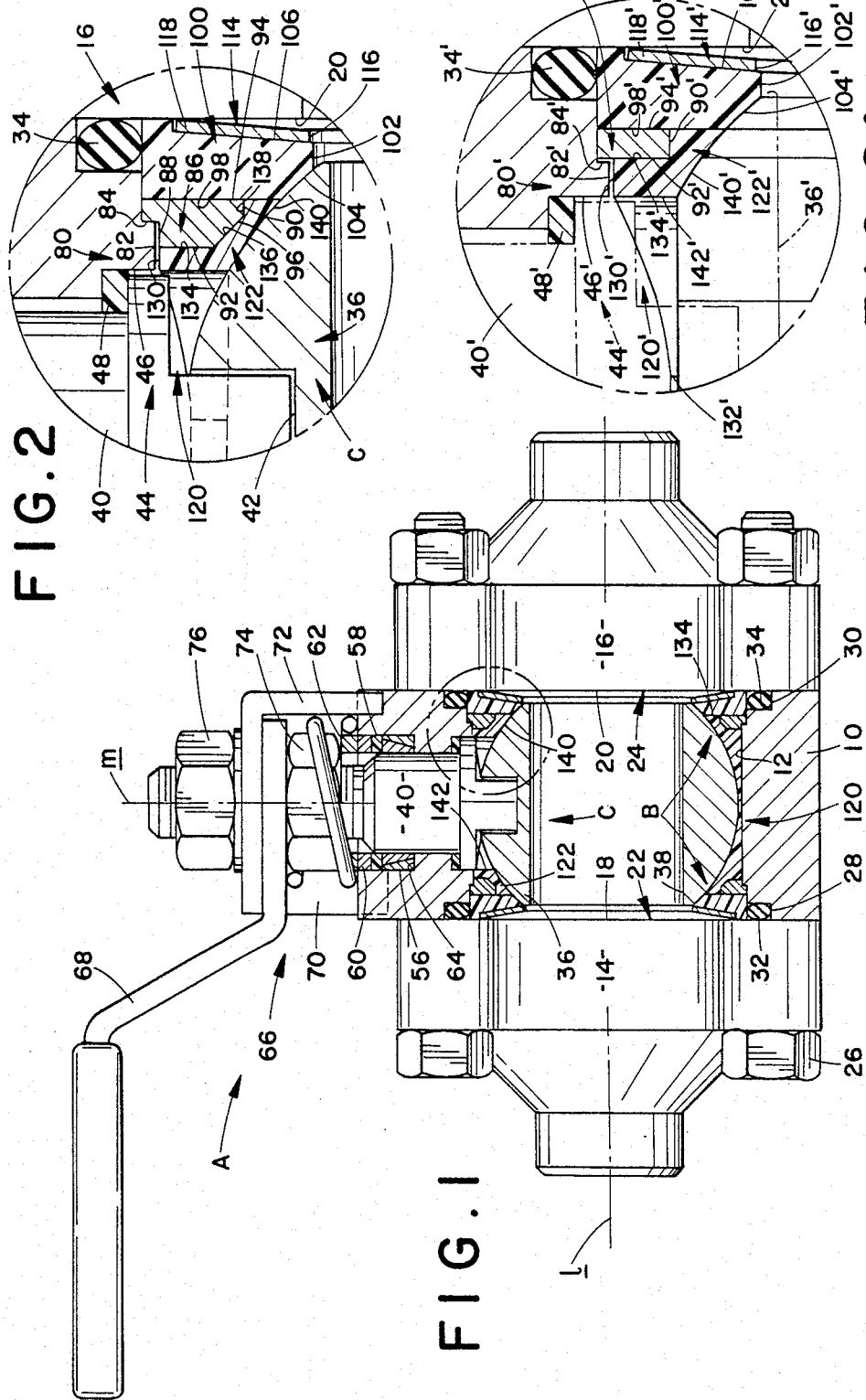

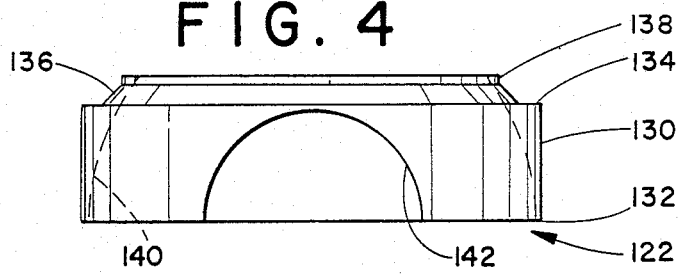
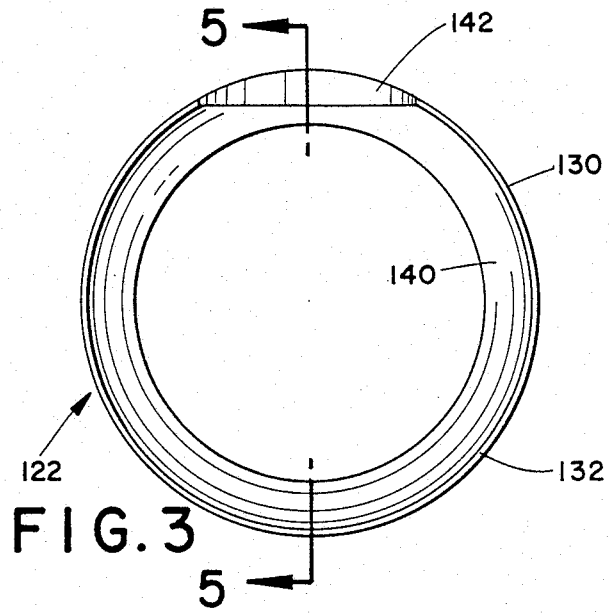
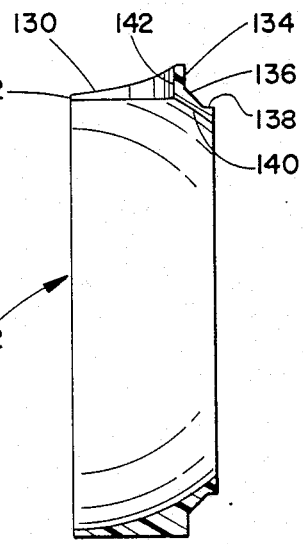
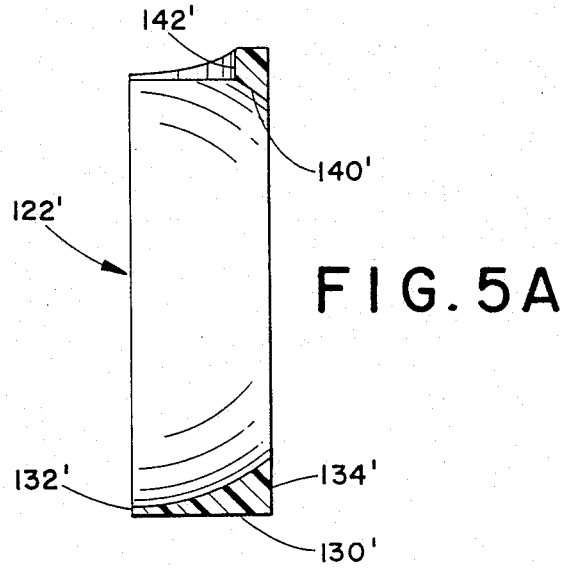

LOW DEAD SPACE RING

This is a continuation of co-pending application Ser. No. 828,751 filed on 2-12-86.

BACKGROUND OF THE INVENTION

This invention pertains to the valve art, and, more particularly, ball valves. The invention is particularly applicable to a new and improved ball valve incorporating a low dead space ring and will be described with particular reference thereto. However, it will be appreciated that the invention has broader applications and could be adapted to use in other types and styles of valves.

Commonly assigned U.S. Pat. Nos. 3,894,718 and 4,410,165 detail the evolution and development of seal assemblies utilized in ball valves, the disclosures of which are hereby incorporated by reference. Generally, early developments of valve seat assemblies for ball valves employed an elementary seat design which included a pair of annular plastic seats that were compacted between the ball member and the wall portions of end fittings. Such seat designs suffered from a number of problems including low sealing forces at low pressure or vacuum conditions, and valve leakage due to wear and tolerance errors.

These early seat designs gave way to a contoured seat design in which the ball member was engaged along its outer periphery by a narrow band or line contact. Wear problems also developed with contoured seat designs and they gave way to the development of the flexible seat. The flexible seat, though, only provided improved operation for short periods of time. A seat ring with a disc spring, as well as an upstream seat bypass arrangement, were other improvements developed by the industry which progressively overcame various problems associated with ball valve seating arrangements. The U.S. Pat. No. 4,410,165 describes a seal assembly which includes a support ring, a disc spring, and a seat ring. This assembly provides additional seat ring support in a floating ball type of valve which is applicable to use in high fluid pressure environments. A longer life span was, in turn, realized at a cost savings with respect to other known seating arrangements.

More specifically, the seat assembly structure of the U.S. Pat. No. 4,410,165 utilizes a pair of resilient seat rings disposed on opposite sides of the ball member. A disc spring is interposed between the end fittings and the seat rings to continuously urge the seat rings into sealing engagement with the ball member. A reinforcing or support ring is disposed at a forward surface of each seat ring for positive locating engagement with a shoulder extending into the valve chamber.

Commonly assigned patent application Ser. No. 542,399, now issued as U.S. Pat. No. 4,602,762, describes a similar seat ring assembly. It recognizes that a reinforcing or support ring need not necessarily be incorporated into the valve seal structure. Instead, any bearing surface disposed in the valve passageway for abutting engagement with the seat ring may be used with equal success.

These latter two arrangements have proved to be quite satisfactory, but after continued use in environments filled with contaminants, the open spaces or voids defined between the ball member, seal assemblies, and the valve chamber walls are subject to eventual contaminant deposit. This contaminant deposit has an adverse effect on the sealing integrity of the ball valve. It has, therefore, been deemed desirable to fill these open spaces or voids in ball valves to further limit the area available in the interior of the valve which could otherwise accommodate fluid flow around the ball. Any such arrangement should not interfere with or reduce the effectiveness of the seal assemblies themselves. The subject invention is deemed to meet these and other needs in providing a new low dead space ring construction.

SUMMARY OF THE INVENTION

In accordance with the present invention, a valve is provided having a valve member disposed for selective movement between open and closed positions within a valve chamber. Seal assemblies are disposed on opposite sides of the valve member, and each seal assembly is comprised of at least a seal ring and a disc spring. The disc spring functions to continuously urge the seat ring into the sealing engagement with the valve member. At least one dead space ring is adapted for receipt in the area of the valve chamber between the valve member, seal assemblies, and the valve chamber walls for reducing the volume of the void or open space therein.

In accordance with another aspect of the invention, the dead space ring has a first curvilinear surface adapted for generally mating engagement with the valve member.

In accordance with another aspect of the invention, the dead space ring is constructed of a low friction material such as polytetrafluoroethylene or the like.

In accordance with a still further aspect of the invention, the dead space ring is constructed of a rigid plastic-like material to limit cold flow thereof.

The principal advantage of the subject invention is the filling of dead space within a valve to effectively limit or reduce the open area otherwise available in the valve chamber which would accommodate fluid flow around the valve member.

Another advantage of the subject invention resides in a structure for a dead space ring which does not cause a substantial increase in the torque required to open and close the valve.

Still other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, preferred and alternate embodiments of which will be described in detail in this specification and illustrated in the accompanying drawings which form a part hereof and wherein:

FIG. 1 is a side elevational view in partial cross-section of a ball valve construction which incorporates the subject invention;

FIG. 2 is an enlarged partial view of the ball valve shown in FIG. 1 at an area thereof adjacent a seat assembly;

FIG. 2A is a view similar to FIG. 2 showing an alternative construction which incorporates the subject invention;

FIG. 3 is an end view of a preferred dead space ring used in accordance with the invention;

FIG. 4 is a plan view of the dead space ring of FIG. 3;

FIG. 5 is a cross-sectional view taken along lines 5—5 of FIG. 3; and,

FIG. 5A is a cross-sectional view similar to FIG. 5 showing an alternative dead space ring used in the embodiment of FIG. 2A.

DETAILED DESCRIPTION OF THE PREFERRED AND ALTERNATE EMBODIMENTS

Referring now to the drawings wherein the showings are for purposes of illustrating preferred and alternate embodiments of the invention only and not for purposes of limiting same, FIG. 1 shows a ball valve A having a pair of seal assemblies B disposed on opposite sides of a floating-type spherical ball or valve member C. The ball member is adapted for selective rotation between valve closed and open positions as is well known in the art.

In FIG. 1, the ball valve A includes a body or housing 10 having a central opening extending therethrough defining a valve chamber 12. A pair of end fittings 14, 16 are situated at opposed ends of the body 10 and include a pair of shoulders 18, 20 defined by end faces 22, 24 of the end fittings. The end fittings are secured to the body by conventional means such as elongated tie bolts 26 and are adapted for retaining the seal assemblies B in generally mating arrangement with the ball valve A. One of ordinary skill in the art will appreciate that through openings (not shown) are included in the respective end fittings generally along longitudinal axis 1 of the valve body to accommodate fluid communication between the valve chamber and an external fluid system or associated piping in a known manner. A pair of grooves 28, 30 at opposite ends of the body are open axially toward the end fittings and radially toward the seal assemblies and receive seal members 32, 34 such as O-rings or the like. In this manner, the end fittings and seal assemblies may be placed in sealed relationship with the valve body 10.

A ball member 36 is dimensioned for close receipt within the valve chamber 12, occupying a major portion of the chamber, and includes an axial passage 38 formed therethrough. The ball member is adapted for selective rotation about a stem axis m to align the passage 38 with the respective through openings formed in the end fittings. As is known, a spade portion of a stem 40 is operatively received in a slot or groove 42 formed in the ball member. The stem penetrates through the side wall of the body and includes a radially extending flange 44 (FIG. 2) cooperable with a recessed or counterbalanced area 46 formed in the body to prevent removal of the stem outwardly from the body along stem axis m. In addition, flange 44 provides a lower support for a thrust washer 48.

With reference again to FIG. 1, stem packing members 56, 58, 60, 62 are disposed at axially-spaced intervals about the stem. The lowermost packing member 56 may be comprised of a pair of chevron packings which cooperate along facing angularly oriented faces. Application of axial pressure to the chevron packings thus exerts a tight, radially directed sealing force against the stem and body. Packings 56, 58, 60 are supported by a shoulder 64 formed in the body. Cylindrical metal gland 62 transfers compressive forces to the remaining stem packing members supported in the body. An analogous stem packing structure and function is detailed in commonly assigned U.S. Pat. No. 4,558,874.

An actuating mechanism 66 is generally shown as comprising a handle member 68 and includes having a pair of downwardly depending stop surfaces 70, 72 for predetermined engagement with the exterior of the body 10 at valve open and closed conditions. A pair of nuts 74, 76 are threadedly received on the stem at lower and upper surfaces of the handle, respectively, for placing the stem packing in a proper sealing condition and for clampingly retaining the handle member on the stem. It will be understood by one of ordinary skill in the art, however, that other types of actuating means may be satisfactorily employed without departing from the overall spirit or scope of the invention.

With primary reference to FIG. 2, as well as continued reference to FIG. 1, description will be made of the specific details of the seal assemblies B. FIG. 2 particularly illustrates a portion of one seal assembly in the assembled condition and it will be understood that the following description is equally applicable to the other seal assembly unless otherwise specifically noted. First, a circumferentially continuous shoulder generally designated 80 extends inwardly into valve chamber 12 from the body 10, and is defined by a first axial surface 82 and second radial bearing or support surface 84. Seal assembly B includes a reinforcing or support ring 86 having a notch-like first surface 88 abuttingly engaging radial surface 84 of the shoulder. The support ring has a through opening 90 radially spaced from the outer circumference of the ball member, and radially oriented end surfaces 92, 94 which are substantially parallel to one another. The support ring also includes a conical second surface 96 interconnecting the opening 90 and end surface 92. This conical surface is in generally parallel spaced relation with the circumference of the ball member 36. Moreover, support ring end surface 94 is adapted for abutting engagement with a first surface 98 of a seat ring 100.

Alternatively, and as described above with respect to commonly assigned application Ser. No. 542,399, now U.S. Pat. No. 4,602,762, a reinforcing or support ring 86 need not be incorporated into selected valve structures. If the support ring is eliminated, bearing surface 84 will necessarily support the seat ring first surface 98 without any adverse effect. The remaining description will refer to a valve structure utilizing a separate support ring interposed between circumferential shoulder 80 and seat ring 100, although one of ordinary skill in the art will appreciate that the support ring could be eliminated in certain, selected valve arrangements and the remaining structure function in substantially the same manner.

The seat ring 100 is formed of a resilient material such as a plastic or plastic-like material. Such, material may, however, vary depending upon the specific operating conditions to which the valve will be subjected. The seat ring has a through opening 102 disposed radially inward with respect to the opening 90 of the support ring 86. A second, generally curvilinear surface 104 has a radius of curvature in an unstressed, unassembled condition which is greater than the radius of curvature on the outer surface of the ball member C. A third surface 106 faces the adjacent end fitting 16, and is frustoconical and generally parallel to the seat ring first surface 98. The third surface is adapted for engagement with a disc spring 114.

In an uncompressed state, the disc spring 114 has a generally frustoconical conformation. When assembled in the ball valve, the disc spring is moved toward a substantially flattened condition so that a first radially inner portion 116 engages the seat ring at third surface 106 while a radially outer portion 118 abuts the shoulder 20 of end fitting 16. The flattened condition of the disc spring causes the seat ring 100 to be continuously biased into a sealing relationship with the ball member 36 substantially along the curvilinear surface 104 in the manner illustrated.

Repeated openings and closings of the valve, especially in a harsh fluid system environment, result in the passage of contaminants into the cavity 120 (FIGS. 1 and 2) formed between the ball member, valve chamber, and seal assemblies. Entry of contaminants into this cavity can restrict or reduce proper functioning of the valve. The subject invention provides a precise path for the flow of fluid through the valve and prohibits entry of fluid into the cavity 120 whereby the effective valve life is extended and the valve functions smoothly.

As illustrated in FIGS. 1 and 2, the cavity 120 is substantially filled through use of a pair of identical dead space rings 122. One of the dead space rings is shown in detail in FIGS. 3-5 and generally designated by numeral 122, it being appreciated that the other dead space ring is identical thereto. The dead space rings are comprised of a low friction material to limit any increase in torque required for operating the valve in view of the presence of such dead space rings. For example, the preferred and alternate embodiments of the dead space rings which are disclosed herein utilize polytetrafluoroethylene impregnated with reinforcing glass or carbon fiber. However, it will be appreciated that other materials could also be used to accommodate different operating conditions and/or parameters.

More specifically, the outer surface or circumference 130 of ring 122 is designed for close mating receipt by the side wall of the valve chamber 12. In the preferred embodiment shown, the outer surface of the dead space ring has a generally smooth contour and extends from an inner edge 132 to a rear shoulder 134. The ring further includes an outer, tapered surface 136 interposed between shoulder 134 and an outer edge portion 138. As particularly shown in FIG. 2, the shoulder 134, tapered surface 136, and outer edge portion 138 conform to the end face 92, curvilinear surface 96, and opening 90, respectively, of the support ring 86. A central, through opening in the ring is defined by a generally curvilinear surface 140 and is concentrically spaced from the outer circumference 130 for establishing a close mating relationship with the outer surface of the ball member. The central opening gradually decreases in size from its largest diameter at inner edge 132 to its smallest diameter at outer edge portion 138 (FIG. 4). The inner edge 132 of the dead space ring shown in FIGS. 3-5 abuts or nearly abuts the corresponding edge on the other dead space ring. Also, outer edge portion 138 of each dead space ring engages from surface 98 of the associated seat ring (FIGS. 1 and 2). An arcuate cutout 142 extends through the side wall of the dead space ring. When the cutouts in the pair of dead space rings are placed in opposed relation to each other, they accommodate the actuating stem of the valve as best shown in FIG. 1. The cutouts are designed to closely receive the flange 44.

With respect to this preferred embodiment of the dead space rings, and upon assembly of the ball valve, the dead space rings 122 are initially fitted about the ball valve and the seal assemblies B are then placed into the valve chamber 12. The end fittings 14, 16 are thereafter placed in abutting relationship with the valve body and retained in a valve asesmbled condition as by the fasteners 26. Once assembled, the cavity 120, which was normally left open in the prior art, valves, is now filled by the pair of dead space rings. The low frictional material does not substantially increase the torque required of an operator in rotating the ball member between valve open and closed positions.

Additionally, the dead space rings are formed of a rigid material so as to limit cold flow of the rings into the passageway 38 of the ball member. When the valve is closed, the dead space rings must continually span the fluid passageway of the ball member. The dead space rings are unsupported in spanning the opening and are, therefore, subject to deflection and deformation. To minimize the likelihood of deformation, the dead space rings are formed of a rigid material such as the impregnated polytetrafluorethylene previously identified. This provides extended valve life while preventing interference with the mechanism and advantages of the seal assemblies disposed in opposed relation to each other on opposite sides of the ball member. The overall assembly exhibits a low pressure sealing action that compensates for wear of the seal member and prevents contaminant entry into the valve chamber void.

FIGS. 2A and 5A illustrates an alternative embodiment of the previously described dead space ring. Here, too, only one seal assembly will be described in detail, it being understood that such description applies equally to the other seal assembly unless otherwise specifically noted. Additionally, for ease of illustration, like elements are identified by like numerals with a primed (') suffix and new elements identified by new numerals.

In FIG. 2A, a shoulder 80' includes first and second surfaces 82', 84', the second surface 84' adapted for abutting engagement with support ring 86'. This support ring is of simpler construction than was described with reference to the preferred embodiment, and includes an inner opening 90' and end faces 92', 94'. The seat ring 100' and disc spring 114' are of identical construction whereby the seat ring is continuously urged into engaging, sealing relation with the ball member 36'.

The alternate dead space ring 122' of FIG. 5A is also of simpler construction than that of the preferred embodiment. A smooth outer surface 130' extends from an inner edge 132' to a rear surface 134'. The rear surface 134' abuts the support ring 86' substantially along the end face 92'. In addition, an arcuate cutout 142' is provided to closely receive flange 44' of the actuating stem in the same manner previously described. The use and function of this alternative dead space ring also is similar to that previously described.

The invention has been described with reference to preferred and alternate embodiments. Obviously, modifications and alterations will occur to others upon a reading and understanding of this specification. It is intended to include all such modifications and alterations insofar as they come within the scope of the appended claims or the equivalents thereof.

Having thus described the invention, what is claimed is:

1. A ball valve comprising:
   a body having a central passageway;
   a ball member including a fluid flow opening therethrough, said ball member being positioned in said passageway and mounted for selective rotation between valve open and closed positions to control fluid flow through said valve, said ball member further including a radius of curvature on an outer wall surface;

a radially inward extending shoulder in said passageway disposed circumferentially thereof on one side of and generally facing said ball member;

a radially inward extending bearing surface in said passageway disposed circumferentially thereof on one side of said ball member, said bearing surface generally facing said shoulder;

a composite seat member assembly positioned axially in said passageway on one side of said ball member between said shoulder and bearing surface for fluid-sealing engagement with said ball member, said seat member assembly including:

a seat ring adapted for elastic flexure generally toward and away from the associated bearing surface and including a central opening, a first surface generally facing said shoulder, a second surface abutting said bearing surface, and a third surface facing said ball member for sealing engagement with said ball member outer wall surface, said seat ring third surface being contoured and having a radius of curvature in an unstressed, unassembled condition greater than the radius of said ball member;

a disc spring having a central opening and a generally frustoconical configuration in an unstressed condition interposed between said seat ring and said shoulder;

a dead space ring formed an impregnated material providing substantial rigidity to limit cold flow of said ring into the passageway as said ball member is rotated between open and closed positions, said material having low coefficient of friction properties to facilitate rotation of said ball member without substantially increasing the amount of torque required to rotate said ball member relative to the torque required to rotate the ball member in the absence of said dead space ring, said dead space ring including a first curvilinear surface closely engaging said ball member, a second surface generally facing said shoulder, an outer smoothly contoured surface in close mating receipt by said passageway, said dead space ring further including an open ended arcuate cutout extending through a side wall thereof from an inner edge adapted to closely receive an associated actuating stem therein wherein said dead space ring substantially fills said central passageway; and, said ball member and composite seat member assembly being sized so that when assembled said seat ring is flexed away from said bearing surface and stressed to have a radius of curvature at said seat ring third surface generally equivalent to said ball member radius of curvature and is disposed in sealing engagement with said ball member over the extent of said seat ring third surface, said disc spring being stressed toward a flattened condition for continuously urging the third surface of said seat rings toward engagement with said ball member.

* * * * *